(12) United States Patent
Sostmann et al.

(10) Patent No.: US 8,821,982 B2
(45) Date of Patent: Sep. 2, 2014

(54) METHOD OF MAKING A SOLVENT-FREE POLYMER-BASED TIRE SEALANT

(75) Inventors: Stefan Sostmann, Langenhagen (DE); Martin Welzhofer, Hannover (DE); Joe Guardalabene, Hannover (DE); Casper Van De Pol, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 1318 days.

(21) Appl. No.: 12/591,517

(22) Filed: Nov. 23, 2009

(65) Prior Publication Data

US 2010/0119715 A1 May 13, 2010

Related U.S. Application Data

(63) Continuation of application No. PCT/EP2008/052554, filed on Mar. 3, 2008.

(30) Foreign Application Priority Data

May 23, 2007 (DE) .......................... 10 2007 023 994

(51) Int. Cl.
| | |
|---|---|
| *B05D 3/02* | (2006.01) |
| *B29C 73/16* | (2006.01) |
| *B29C 73/20* | (2006.01) |
| *B29L 30/00* | (2006.01) |

(52) U.S. Cl.
CPC ............... *B29C 73/163* (2013.01); *B29C 73/20* (2013.01); *B29L 2030/00* (2013.01)
USPC ..... 427/316; 427/393.5; 524/571; 524/575.5; 524/574

(58) Field of Classification Search
CPC ........................................................ B05D 3/02
USPC ............. 427/316, 373.5; 524/571, 575.5, 574
See application file for complete search history.

(56) References Cited

U.S. PATENT DOCUMENTS

| | | | | |
|---|---|---|---|---|
| 3,935,893 | A | * | 2/1976 | Stang et al. .................... 152/504 |
| 4,068,027 | A | | 1/1978 | Van Ornum |
| 4,113,799 | A | | 9/1978 | Van Ornum et al. |
| 4,238,840 | A | * | 12/1980 | Swainson ...................... 365/119 |
| 4,289,089 | A | | 9/1981 | Tacke et al. |
| 4,913,209 | A | | 4/1990 | Hong et al. |
| 2004/0202043 | A1 | * | 10/2004 | Chikami et al. ............ 366/172.1 |
| 2004/0226717 | A1 | * | 11/2004 | Reddy et al. .................. 166/295 |

* cited by examiner

*Primary Examiner* — Timothy Meeks
*Assistant Examiner* — Nathan T Leong
(74) *Attorney, Agent, or Firm* — Walter Ottesen P.A.

(57) ABSTRACT

The invention relates to a method for the production of a tire sealant (C) with a polymeric base. A highly viscous first sealant component (A) (including a natural rubber component that is undiluted or diluted with at least one additional natural rubber component and mixture ingredients that are free of a solvent and an activator) is mixed with at least one second sealant component (B) (comprising a separately produced medium with low viscosity containing at least one activator), to combine to the tire sealant (C), wherein a cross linking occurs associated with the subsequent application of the tire sealant (C) to the inside of the tire. Appropriate method steps are disclosed.

28 Claims, No Drawings

METHOD OF MAKING A SOLVENT-FREE POLYMER-BASED TIRE SEALANT

CROSS REFERENCE TO RELATED APPLICATIONS

This application is a continuation application of international patent application PCT/EP 2008/052554, filed Mar. 3, 2008, designating the United States and claiming priority from German application 10 2007 023 994.9, filed May 23, 2007, and the entire content of both applications is incorporated herein by reference.

FIELD OF THE INVENTION

The invention relates to a process for the production of a polymer-based tire sealant.

BACKGROUND OF THE INVENTION

With respect to the above, reference is particularly made to the following publications as to relevant prior art for tire sealants which are effective in the event of damage, for example when the tread is punctured by a nail: German patent publication 26 31 691 A1 and U.S. Pat. Nos. 4,068,027; 4,113,799; and, 4,289,089.

German published patent publication 26 31 691 A1 describes a tire sealant which has a self-healing effect in the event of perforation of the tire tread. The tire sealant is based on a reinforced, partially crosslinked matrix composed of a copolymer having moderate to high molecular weight and is applied to the interior surface of rubber tires, and serves to seal perforations in the tire-tread region under a very wide variety of temperature conditions (from −30° C. to +130° C.). Solvents are used in the production of the tire sealant, examples being toluene, hexane, heptane, naphtha, trichloroethylene, cyclohexane and tetrahydrofuran.

U.S. Pat. No. 4,068,027 describes a tire sealant based on a crosslinked butyl rubber. This tire sealant is composed of two components and one of these includes the butyl rubber. These two components are mixed together shortly before introduction into the tire. The rubber component here is diluted by a solvent, such as hexane, to impart processable viscosities.

U.S. Pat. No. 4,113,799 likewise concerns a tire sealant based on butyl rubber, reinforced and partially crosslinked. It is likewise composed of two components, and here two different types of butyl rubber are used. In other respects, reference is made here to the teaching described above in German patent publication 26 31 691 A1.

Finally, U.S. Pat. No. 4,289,089 describes an apparatus for positioning, between the side walls of a tire, an operating unit which can be used to apply the tire sealant into a tire.

The process technology used hitherto for the production of tire sealants involved the use of solvents for dilution of the polymer, with the following disadvantages:
- The solvents that can be used, in particular the solvents mentioned in German patent publication 26 31 691, are hazardous to the environment and to health.
- Use of the solvent as auxiliary in the process generates additional material costs.
- The solvents have to be removed by suction during the process and reclaimed, and there is therefore also a requirement for expensive additional steps in the process.
- The solvents used hitherto created a risk of explosion during the process.

Solvents remain to some extent within the product and intermediate storage is therefore required. Associated with this, there have also been difficulties with customers' emission requirements.

SUMMARY OF THE INVENTION

With the aim of avoiding the above-mentioned disadvantages, a feature of the novel process for the production of a polymer-based tire sealant (C) is that a high-viscosity first sealant component (A) (encompassing a rubber component, which is unblended or has been blended with at least one further rubber component, and mixture ingredients which are free from any solvent and from any activator) is mixed with at least one second sealant component (B) (the sealant component (B) comprising a separately produced, low-viscosity medium which comprises at least one activator) to form the tire sealant (C). In this process, crosslinking takes place, associated with the subsequent introduction of the tire sealant (C) to the inner side of the tire.

DESCRIPTION OF THE PREFERRED EMBODIMENTS OF THE INVENTION

The individual steps of the process are described in more detail below, inclusive of advantageous process parameters.

First Step of the Process

The first sealant component (A), which, unlike the sealants of the prior art cited in the introduction, is produced without any solvent and is prepared in a mixing device optimized for the processing of high viscosities. The preparation here in particular uses a kneading extruder (batch mixer) or a twin-screw extruder.

The rubber component used for the first sealant component (A) comprises natural rubber (NR), butadiene rubber (BR), isoprene rubber (IR), styrene-butadiene rubber (SBR), polychloroprene (CR), butyl rubber (IIR), bromobutyl rubber (BIIR), or chlorobutyl rubber (CIIR), or a blend of the above-mentioned types of rubber, examples being NR/BR blends, NR/SBR blends, or NR/SBR/BR blends. IIR is of particular importance, in particular unblended.

The mixture ingredients of the first sealant component (A) encompass a filler (for example, carbon black, silica) and/or a processing aid (for example, alkyl resins or phenolic resins) and/or a plasticizer (for example, napthenic oil) and/or an antioxidant (for example, PPDs), and also, if appropriate, further additives (for example, color pigments). It is also possible to admix the crosslinking agent as additive at this early stage, but not the activator. However, it is also possible that the mixture ingredients are free from any crosslinking agent. The crosslinking agent is advantageously added to the first sealant component (A), so as to ensure good dispersion on mixing with the second sealant component (B). It is preferable to use a crosslinking agent from the quinones class, and in turn in particular a quinine dioxime (QDO), such as paraquinone dioxime. The total quantitative proportion of the mixture ingredients inclusive of the crosslinking agent system, namely crosslinking agent and activator (accelerator), is from 5 to 200 phr (per hundred rubber), in particular from 20 to 100 phr. In other respects, reference is made to the general prior art in rubber mixing technology.

Second Step of the Process

The second sealant component (B), which, unlike the first sealant component (A), is of low viscosity, is separately produced in a stirring apparatus. The second sealant component (B) encompasses a medium, in particular a medium that has the consistency of a paste or of an oil, and which at least comprises the activator. The crosslinking agent can have been admixed as further additive, so that the second sealant component (B) encompasses the entire crosslinking agent system. In particular, a peroxidic activator is used, an example being one based on diaroyl peroxides, on diacyl peroxides, or on peroxyesters.

Third Step of the Process

The first sealant component (A) and the second sealant component (B) are introduced, with pumping, separately to a metering apparatus. The following variants are in particular used here:

A diaphragm-based metering device is used for the combinative pumping and metering of the first sealant component (A) and/or of the second sealant component (B). A hydraulic system is advantageously used here for the pumping and metering processes, with the aim of producing a uniform volume flow rate.

With respect to the first sealant component (A) and/or with respect to the second sealant component (B), the pumping process takes place first, and only then does the metering process take place. With respect to the second sealant component (B), a gearwheel-based metering process is used here. The piston-based metering process can be used as alternative for both sealant components (A, B), but in particular for the second sealant component (B).

Fourth Step of the Process

The high-viscosity first sealant component (A) is mixed with the low-viscosity second sealant component (B) in a mixing device to form the tire sealant (C). Crosslinking takes place here. The mixing process here can take place in a static or dynamic mixer.

If appropriate, a third or further component(s), likewise produced separately, can be mixed with the two sealant components (A, B). A third sealant component can, for example, be a paste or oil comprising color pigments. The preparation, the pumping, and the metering of the third or further components take place in accordance with the guidelines for sealant component (B).

Fifth Step of the Process

The tire is preheated prior to contact thereof with the tire sealant (C), and this accelerates the crosslinking process and therefore accelerates completion of the reaction of the tire sealant. The preheating takes place at temperatures from 40° C. to 100° C., in particular from 50° C. to 70° C.

Sixth Step of the Process

The tire sealant (C) is then introduced into a rotating tire. With respect to the introduction process, the following two variants are in particular used here:

The method of introduction of the tire sealant (C) is such that a continuous bead is placed in the tire and, using a winding pattern, covers the intended area on the inner side of the tire, in particular under the tire tread.

Wide nozzle geometry is used for the metering outlet, thus placing a wide bead in the tire and reducing the number of windings. The winding here is in particular achieved in a single pass.

Seventh Step of the Process

Finally, the tire sealant (C) is solidified, specifically to achieve the sealant effect.

It is understood that the foregoing description is that of the preferred embodiments of the invention and that various changes and modifications may be made thereto without departing from the spirit and scope of the invention as defined in the appended claims.

What is claimed is:

1. A method of making a polymer-based tire sealant (C), the method comprising the steps of:
   providing a high viscosity first sealant component (A) comprising:
   (a) a rubber component, which is unblended or has been blended with at least one further rubber component; and,
   (b) mixture ingredients which are free from any solvent and from any activator;
   providing a second sealant component (B) comprising a separately produced low-viscosity medium comprising at least one activator;
   mixing said first sealing component (A) with said second sealing component (B) to form said tire sealant (C) and causing crosslinking to occur; and,
   introducing said tire sealant (C) into the inner side of a tire;
   wherein the first sealant component (A) is prepared with a twin-screw extruder.

2. The method of claim 1, comprising the further steps of:
   preparing the first sealant component (A) in a mixing device optimized for mixing high viscosities;
   separately producing the second sealant component (B) in a stirrer;
   pumping the first sealant component (A) and the second sealant component (B) separately to a metering apparatus;
   then mixing the high-viscosity first sealant component (A) with the low-viscosity second sealant component (B) in a mixing device to form the tire sealant (C);
   introducing the tire sealant (C) into the inner side of the tire; and, allowing the tire sealant (C) to solidify.

3. The method of claim 2, wherein a diaphragm-based metering device is used for the pumping and metering of the first sealant component (A), the second sealant component (B), or both.

4. The method of claim 3, wherein a hydraulic system is used for the pumping and metering to generate a uniform volume flow rate.

5. The method of claim 2, wherein, with respect to the first sealant component (A) and/or with respect to the second sealant component (B), the pumping process takes place first and then the metering process takes place.

6. The method of claim 5, wherein, with respect to the second sealant component (B), a gearwheel-based metering process takes place.

7. The method of claim 5, wherein, with respect to the first sealant component (A) and/or with respect to the second sealant component (B), a piston-based metering process takes place.

8. The method of claim 7, wherein the piston-based metering process takes place for the second sealant component (B).

9. The method of claim 1, wherein the mixing of the first sealant component (A) with the second sealant component (B) to form the tire sealant (C) takes place in a static mixer.

10. The method of claim 1, wherein the mixing of the first sealant component (A) with the second sealant component (B) takes place in a dynamic mixer.

11. The method of claim 1, wherein the tire is preheated prior to contact thereof with the tire sealant (C), accelerating the crosslinking process and thus the completion of the reaction of the tire sealant.

12. The method of claim 11, wherein the tire is preheated at a temperature from 40° C. to 100° C.

13. The method of claim 11, wherein the tire is preheated at a temperature from 50° C. to 70° C.

14. The method of claim 1, wherein the tire sealant (C) is inserted into a rotating tire.

15. The method of claim 1, wherein the method of introduction of the tire sealant (C) is such that a continuous bead is placed in the tire and, using a winding pattern, covers the area to be covered on the inner side of the tire.

16. The method of claim 15, wherein a nozzle with a non-circular or non-square geometry is used for a metering outlet, thus placing a wide bead in the tire.

17. The method of claim 16, wherein the winding pattern is achieved in a single pass.

18. The method of claim 1, wherein the rubber component used for the first sealant component (A) comprises natural rubber (NR), butadiene rubber (BR), isoprene rubber (IR), styrene-butadiene rubber (SBR), polychloroprene (CR), butyl rubber (IIR), bromobutyl rubber (BIIR), or chlorobutyl rubber (CIIR), or a blend of the above-mentioned types of rubber.

19. The method of claim 1, wherein, for the first sealant component (A), mixture ingredients are used encompassing a filler and/or a processing aid and/or a plasticizer and/or an antioxidant, and also, optionally, further additives, where these exclude the activator.

20. The method of claim 1, wherein the first sealant component (A) encompasses a crosslinking agent.

21. The method of claim 1, wherein the first sealant component (A) uses mixture ingredients which are free from any crosslinking agent.

22. The method of claim 21, wherein the crosslinking agent, which forms a crosslinking agent system with the activator, is admixed with the second sealant component (B).

23. The method of claim 20, wherein a crosslinking agent from the quinones class is used.

24. The method of claim 23, wherein the crosslinking agent used comprises a quinone dioxime (QDO).

25. The method of claim 1, wherein the second sealant component (B) comprises a peroxidic activator.

26. The method of claim 1, wherein the total quantitative proportion of mixture ingredients used, inclusive of the crosslinking agent system, is from 5 to 200 phr.

27. The method of claim 26, wherein the total quantitative proportion of mixture ingredients used is from 20 to 100 phr.

28. The method of claim 1, wherein the second sealant component (B) comprises a medium that has the consistency of a paste or of an oil.

\* \* \* \* \*